July 24, 1934.  F. T. COURT  1,967,924
COTTON HARVESTER
Filed March 7, 1932  5 Sheets-Sheet 1

FIG-1

INVENTOR.
Frank T. Court
BY Brown, Jackson
Boettcher & Dienner
ATTORNEYS.

WITNESS
WALTER ACKERMAN

Patented July 24, 1934

1,967,924

UNITED STATES PATENT OFFICE 1,967,924

COTTON HARVESTER

Frank T. Court, Moline, Ill., assignor to Deere & Company, Moline, Ill., a corporation of Illinois Application March 7, 1932, Serial No. 597,150

39 Claims. (Cl. 56—14)

The present invention relates to cotton harvesters, and more particularly to a cotton harvester of the type adapted to be mounted upon a general purpose tractor and to be operated by suitable power take-off connections.

More specifically, the present invention is primarily concerned with the provision of a rotating element disposed in the throat of the stripping mechanism for the purpose of preventing an accumulation of material, such as weeds, soil and the like, at this point. When working in weedy fields there is a tendency for trash to collect in the throat of the machine which clogs it and prevents the proper operation thereof. By the provision of this rotating element clogging and the like is prevented and the cotton is properly fed or directed to the stripping means.

The present invention also contemplates the provision of a movable housing connected with the forward end of the housing enclosing the stripping means, these two housings operating to enclose the rotating element mentioned above. The present invention also contemplates the provision of a raking attachment for directing loose cotton toward the stripping means and the anti-clogging means. Occasionally, cotton harvesters are called upon to operate in a field in which much of the cotton has fallen from the plants and is lying on the ground around the plants. In this connection the present invention contemplates an attachment to be connected to the front end of the stripping means, specifically, the front end of the housing enclosing the anti-clogging means. This attachment preferably includes rotatable ground engaging means arranged to have a peripheral velocity somewhat in excess of the forward velocity of the machine, these ground engaging portions thus acting to direct loose cotton toward the stripping means.

This is an important feature of the present invention, particularly in connection with cotton harvesters or cotton strippers employing the feature of a rotatable element in the throat of the stripping mechanism to prevent clogging. Where such anti-clogging means is provided a machine can be equipped with raking means to gather all loose cotton from the ground without danger of clogging the machine due to plants, trash, soil and the like which may some times be directed toward the mechanism.

It is also contemplated by the present invention to provide on form of raking means which embodies a pair of rotatable raking elements disposed at an angle to one another with their upper portions spaced apart and their lower portions, which are the ground engaging portions, close together, in connection with means for preventing interference between the plants as they move through the machine and the rotatable raking elements, particularly the upper portions thereof.

These and other advantages will be apparent to those skilled in the art after a consideration of the following detailed description of the preferred structural embodiment, taken in conjunction with the accompanying drawings, in which:

Figure 1:
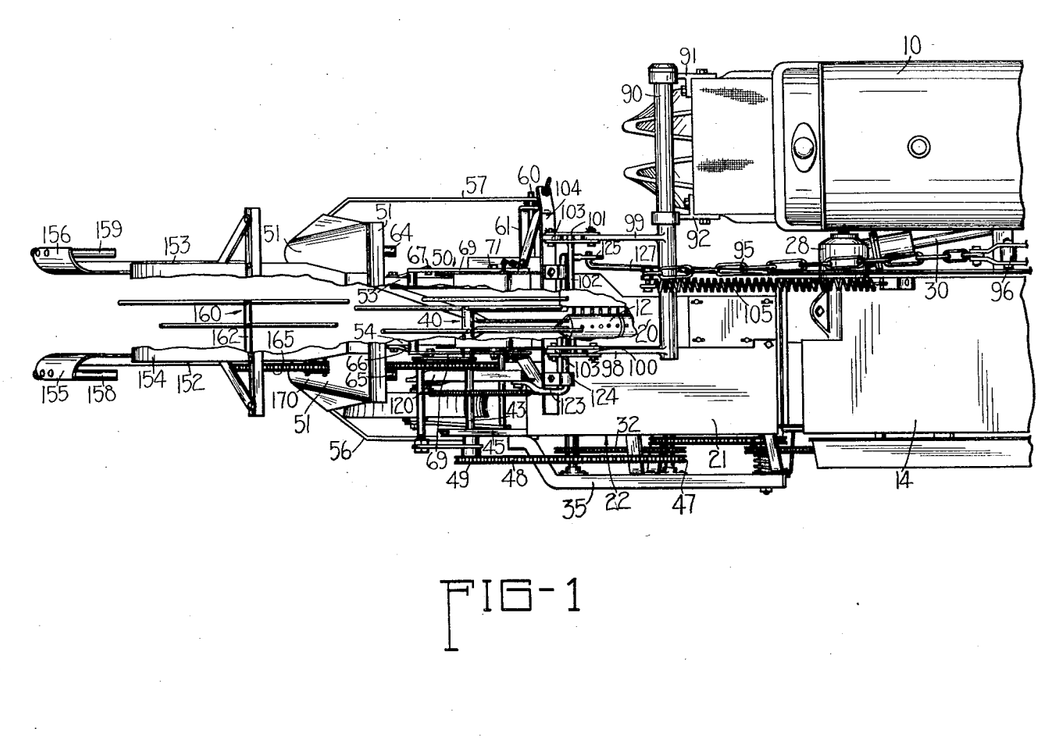
Figure 1 is a top plan view, with certain parts being broken away, of a machine embodying the principles of the present invention.

Referring now to the drawings, particularly Figures 1 to 5 inclusive, the reference numeral 10 indicates a tractor of the general purpose type and, as such, the tractor in the illustrated embodiment serves as a wheeled supporting frame for the mechanisms of a cotton harvester of the self-propelled type. Of course, it is to be understood that where desirable the principles of the present invention can be embodied in machines not of the self-propelled type. The cotton harvesting mechanisms supported by or connected with the tractor 10 includes downwardly and forwardly inclined stripping means 11 consisting primarily of a rotatable stripping roll 12 and combined cleaner and conveyor mechanism 14 of the usual type arranged to receive the cotton from the stripping means. In the present embodiment the stripping means or mechanism is enclosed by a tunnel housing or hood 15 disposed over the top of the stripping mechanism and comprising spaced apart side walls 17 and 18 and a top wall 20. The left hand side member or plate extends upwardly from the inner edge of the cover 21 of the housing 22 which encloses the elevating members 25 cooperating with the stripping roll 12 to move the cotton rearwardly after the same has been stripped from the plants by the stripping roll 12. The conveyor members 25 and the stripping roll 12 are driven from a power shaft 27. One end of this shaft is driven by a set of bevel gears enclosed within a bevel gear housing 28. The power take-off shaft 30 of the tractor extends into the housing 28 and serves, through said bevel gears, to drive the power shaft 27. The stripping mechanism 11 as a whole has pivotal movement about the axis of the shaft 27 so that the stripping mechanism may follow the contour of the ground traversed by the machine. Power is taken from the power shaft 27 by a plurality of sprockets and chains, indicated generally by the reference numeral 32, to drive the conveyor elements 25 while the stripping roll 12 is driven directly from the power shaft 27 through bevel gears enclosed within a housing 33, see Figure 3. The conveyor elements 25 are carried upon separate shafts journaled in the side walls of the stripper housing 22, the ends of the shafts carrying the sprockets over which the chains 32 are trained being reinforced by an angle bar 35 as best shown in Figure 1. The right hand side wall 17 of the tunnel housing 15 cooperates with the stripping roll 12 to present a smooth surface or wall adjacent thereto whereby the stripping roll 12 is made operative to remove cotton from the plants passing through the machine.

The forward end of the tunnel housing 15 and the stripper housing 22 is open to receive plants, and in order to prevent clogging of material at this point the present invention contemplates the provision of anti-clogging means in the form of a rotatable member 40. This member comprises a plurality of radially extending arms 41 fixed at their inner ends to a transverse shaft 43, the latter being journaled on the forward end of the stripping mechanism near the upper edge 45 of the stripper housing 22 and in the side members or side plates 17 and 18 of the tunnel housing 15. The rotatable anti-clogging member 40 is driven by means of a sprocket 47 fixed near the outer end of the shaft of one of the intermediate conveyor members 25 and a chain 48 trained thereover and over a second sprocket 49 fixed near the outer end of the shaft 43. It will thus be seen that the anti-clogging member 40 is driven from the stripping mechanism, the latter being driven in this case by the power of the tractor although this is not an essential feature of the present invention. As will be best seen in Figure 3, the rotatable member 40 is disposed above and slightly forward of the front end of the stripping mechanism and is in position to operate directly over the cotton plants as they move toward and through the stripping mechanism. The arms 41 of the anti-clogging member are generally radially disposed and are made of sufficient strength so that the cotton stalks of the plants do not interfere with its operation. The continued rotation of this member serves to prevent any tendency for material to accumulate at this point, which at times occurs in trashy fields or fields where there are many weeds and the like.

Figures 3, 4:
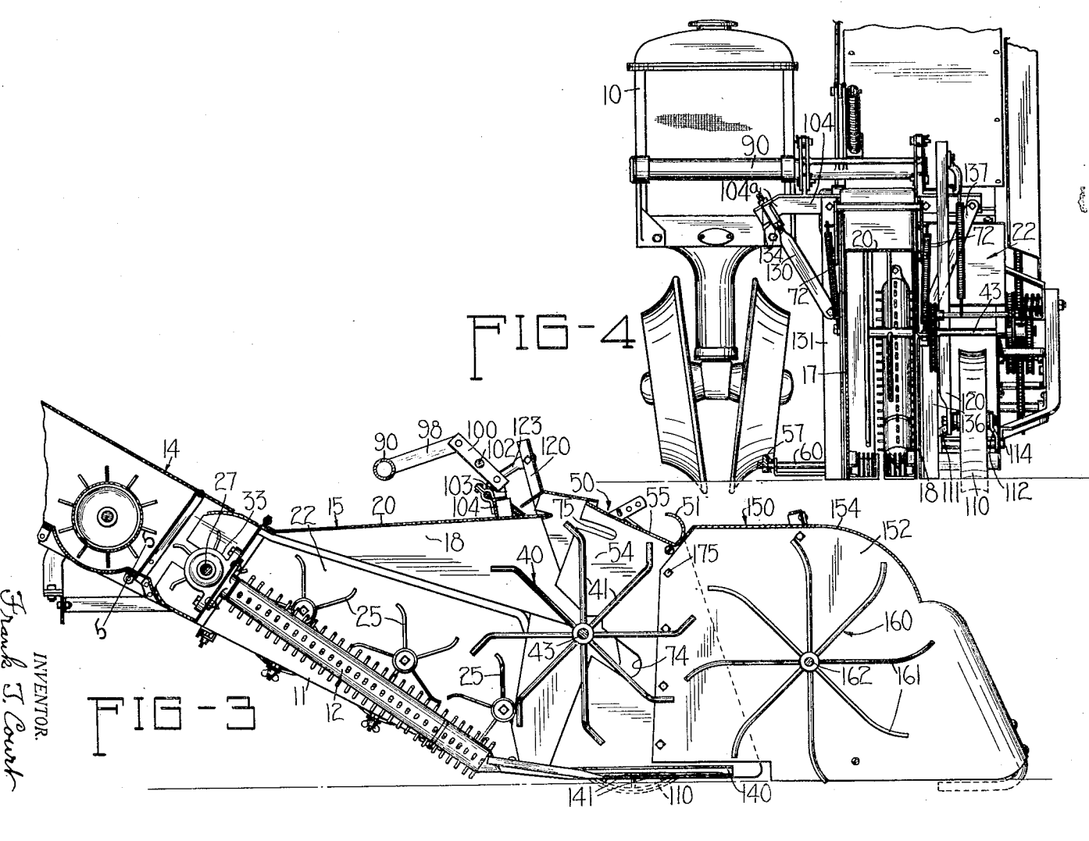
Figure 3 is an enlarged fragmentary cross sectional view taken substantially midway through the machine shown in Figure 1.
Figure 4 is a cross sectional view taken along the line 4—4 of Figure 2.

As will be best seen in Figure 3, the anti-clogging member 40 is disposed partly in the forward ends of the tunnel housing 15 and the stripper housing 22. In order to completely enclose this member, a second tunnel housing 50 has been provided and is telescopically associated with the forward ends of the housings 15 and 22. The forward portion of the tunnel housing 50 is flared, as indicated at 51, and the rear portion leads into the front ends of the housings 15 and 22 and serves to direct plants in that direction. Like the tunnel housing 15, the tunnel housing 50 includes side plates 53 and 54 and a top plate 55. The tunnel housing 50 is pivotally connected with the stripping mechanism by means of a pair of rearwardly extending arms 56 and 57, the arm 56 being pivoted to the outer wall of the housing 22 by means of a pin 58 while the other arm 57 is pivoted on a pin 60 supported by means of a bracket 61 extending outwardly from the side wall 17 of the tunnel housing 15. At its front end the tunnel housing 50 is provided with a pair of ground engaging shoes 64 and 65 which ride on the ground and support the forward portion of the tunnel 50 while the rear portion of the tunnel 50 is carried by the front end of the stripper mechanism through links 66 and 67, the upper ends of which are connected with bell cranks 68 and 69 pivoted at 70 and 71. The other arm of each of the bell cranks is connected by means of a spring 73 to the sides 17 and 18 of the tunnel housing 15. To permit the tunnel housing 15 to telescope into the tunnel housing 50 the sides 53 and 54 have been notched, as shown at 74, to receive the shaft 43 and as shown at 75 to receive the top plate 20 of the tunnel housing 15. The notches 74 and 75 are preferably cut on an arc about the axis 58—60 as a center. On each of the side plates 17 and 18 of the tunnel housing 15 a stop member 80 is provided against which the rear arms of the bell cranks 68 and 69 will contact. This serves to prevent the tunnel housing 50 from moving downwardly too far with respect to the front ends of the housings 15 and 22, particularly when the stripper mechanism is raised to transport position.

For raising the stripping mechanism to transport position power operated means is preferably provided. The raising and lowering mechanism comprises a rock shaft 90 journaled in brackets 91 and 92 secured to the forward end of the tractor 10. The rock shaft 90 is provided with an arm 94 to which a chain 95 is connected at the forward end thereof, the rear end of the chain being connected to a link 96 preferably operated from the usual power lift of the tractor 10 but which, if desired, may be operated manually or by any other suitable means available. The rock shaft 90 also is provided with a pair of arms 98 and 99 to the outer ends of which a pair of interconnected links 100 and 101 are connected. The links 100 and 101 are connected together by means of a bar 102.

The lower ends of the links 100 and 101 are pivotally connected to upstanding lugs 103 fixed to a transverse cross member 104 rigidly connected near the forward end of the tunnel housing 15. The weight of the stripping mechanism is substantially balanced by means of a counterbalancing spring 105. As is obvious, operation of the rock shaft 90 raises or lowers the entire front end of the tunnel housings 15 and 50 and the stripper housing 22. The tunnel housing 50, while being loosely pivoted to the stripper housing, is prevented from moving downwardly too far relative to the tunnel housing 15 by virtue of the stops 80 cooperating with the bell cranks 68 and 69 as mentioned above.

The stripping mechanism is supported at its rear end for pivotal movement about the power shaft 27, as mentioned above, and at its front end the stripping mechanism is supported on gauging wheel 110. The gauging wheel is carried between a pair of arms 111 and 112, see Figure 4, and these arms are pivoted for rocking movement about a pin 114 carried at the front end of the stripping mechanism.

The position at which the front end of the stripping mechanism operates is controlled through connections comprising a link 120 which is pivotally connected at its lower end to the journal axle of the gauge wheel 110. At its upper end the link 120 is connected to an arm 123 which forms an integral part of a rock shaft 124 journaled in suitable brackets secured to the cross angle iron or transverse member 104. The rock shaft 124 is provided at the end opposite the arm 123 with a second arm 125 to which an adjusting rod 127 is connected. This adjusting rod extends to the rear of the tractor to a point adjacent the operator's position thereon where it is connected with any suitable hand operated lever or the equivalent.

As is apparent, shifting the adjusting rod 127 in a fore and aft direction rocks the shaft 124 and, with the outer end of the arm 123 connected with the link 120 and acting as a fulcrum therefor, the rocking of the shaft 124 serves to raise and lower the front end of the stripping mechanism, including the tunnel housings 15 and 50 as well as the stripper housing 22.

Mention was made above that the right hand side member 17 of the tunnel housing 15 cooperates with the stripping roll 12 in removing cotton from the plants as they pass through the machine. The distance this side member or wall 17 is spaced from the stripping roll is important and must be properly spaced otherwise the best operation will not be secured. The present invention contemplates means for adjusting this distance, this being performed in the illustrated embodiment through an adjustment comprising a link or brace 130 pivotally connected to a vertical angle iron 131 fixed to the side of the plate 17. The upper end of the link 130 is threaded and extends through a perforation in the end of the transverse bar or cross member 104. In order to provide for the angularity of the link 130 with respect to the transverse bar 104 the latter has its end bent angularly as indicate at 104a in Figure 4. Adjusting nuts 134 are provided and by adjusting these nuts the wall 17 can be drawn away from or disposed closer to the stripping roll 12. The opposite side of the tunnel housing 15 need not be adjustably secured but in the present invention the opposite side or wall 18 is reenforced by brace means similar to the link 130 but which is not made adjustable. Like the side member 17, the side member or wall 18 is equipped with a vertical angle iron 136 and connected between this part and the opposite end of the transverse bar 104 is a brace 137. By virtue of this construction a rigid sturdy housing is provided. It is to be understood, of course, that if desired the wall 18 may be made adjustable in a manner similar to that just described for the wall 17.

In the illustrated construction means are provided on the hood or tunnel housing 50 for guiding the plants toward the stripping means. For this purpose a series of gratings comprising channel irons 140, one secured to each of the side walls of the tunnel housing 50, and a series of rearwardly and then upwardly extending fingers 141 fixed to the channel irons is provided. Preferably these gratings are disposed underneath the rotatable anti-clogging member 40, although this is not essential. Being carried by the hood or housing 50 which is pivoted at 58 and 60 to the housing 22 of the stripping mechanism, the guiding grates 140—141 are pivotally mounted with respect to the stripping mechanism for free floating movement so as to effectively follow irregularities in the ground surface for guiding loose cotton on the ground toward the stripping mechanism.

The machine as described above constitutes a cotton harvester as the same may be used under favorable or ordinary conditions, and its operation is as follows. The tractor 10 is operated to cause the stripping mechanism to pass down a row of plants so that the plants pass between the side walls 53 and 54 of the tunnel housing 50, the stripping mechanism, conveyor elements 25 and the anti-clogging member 40 being driven from the power of the tractor. The gratings 140 feed or direct the plants toward the stripping mechanism and the rotatable element 40 keeps the throatway of the stripper clear and prevents any tendency for trash, weeds and the like to collect at this point.

Occasionally the machine is called upon to operate in a field in which much of the cotton has fallen from the plants and is lying on the ground about the plants. To accommodate this condition the present invention contemplates the provision of an attachment which is adapted to be connected to the front end of the cotton stripper, particularly to the front end of the tunnel housing 50, for the purpose of conveying or raking the cotton lying on the ground into the machine. This attachment includes a tunnel or hood 150 having sides 152 and 153 and a top 154. The side members 152 and 153 are each flared outwardly, as shown at 155 and 156, and a pair of shoes 158 and 159 are adapted to ride along the ground and to support the forward end of the attachment tunnel 150. Within this tunnel or housing 150 another rotating member 160 is provided, this rotating member comprising a series of flexible ground engaging fingers 161 mounted on a shaft 162 journaled in the side members 152 and 153 of the tunnel housing 150. These fingers 161 are long enough to rake the ground surface and have such a degree of flexibility that they act to throw the loose cotton lying on the ground rearwardly. As best shown in Figure 1, the rotating or raking member 160 rides directly over the cotton plants in exactly the same manner as the rotating or anti-clogging member 40.

Figures 2, 5:
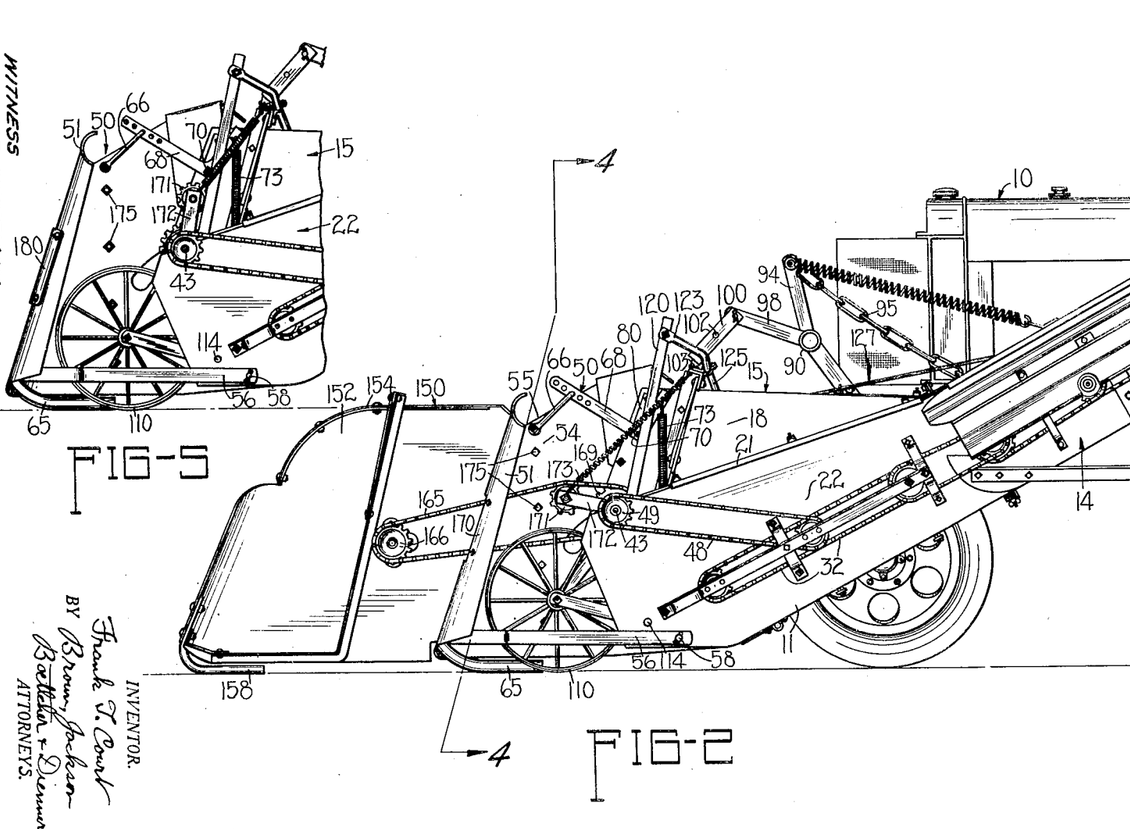
Figure 2 is a vertical elevation of the machine shown in Figure 1.
Figure 5 is a detail view showing the forward end of the stripping mechanism and the pivoted hood or housing enclosing the anti-clogging means with the second hood or housing, which forms a part of the raking means, detached therefrom.

The rotatable rake member 160 is driven by means of a chain 165 trained over a sprocket 166 carried by the shaft 162 and over a sprocket 169 fixed onto the shaft 43 which drives the rotating member 40. To provide for this arrangement the left hand flared portion 51 of the tunnel housing 50 is provided with an opening 170 through which the chain 165 passes. The chain 165 is kept taut by means of an idler sprocket 171 mounted on swinging arms 172 and equipped with a spring 173 biasing the idler for upward movement. The driving means for the rotating member 160 is so arranged that this member is driven at a speed so that its peripheral velocity is substantially greater than the speed of forward advance of the machine so that all loose cotton may be directed toward the stripping means. Preferably, the attachment tunnel 150 is rigidly secured to the tunnel housing 50 by means of a series of bolts 175, see Figures 2, 3, and 5. The attachment 150 is generally not employed unless the conditions outlined above occur, and when the attachment is not used the opening 170 is closed by means of a plate 180 as shown in Figure 5. When the attachment 150 is not used the idler 171 and associated parts take the positions shown in Figure 5. Further, when the attachment is used, heavier springs 72 and 73 may be used than those employed when the attachment is not used.

Figure 6:
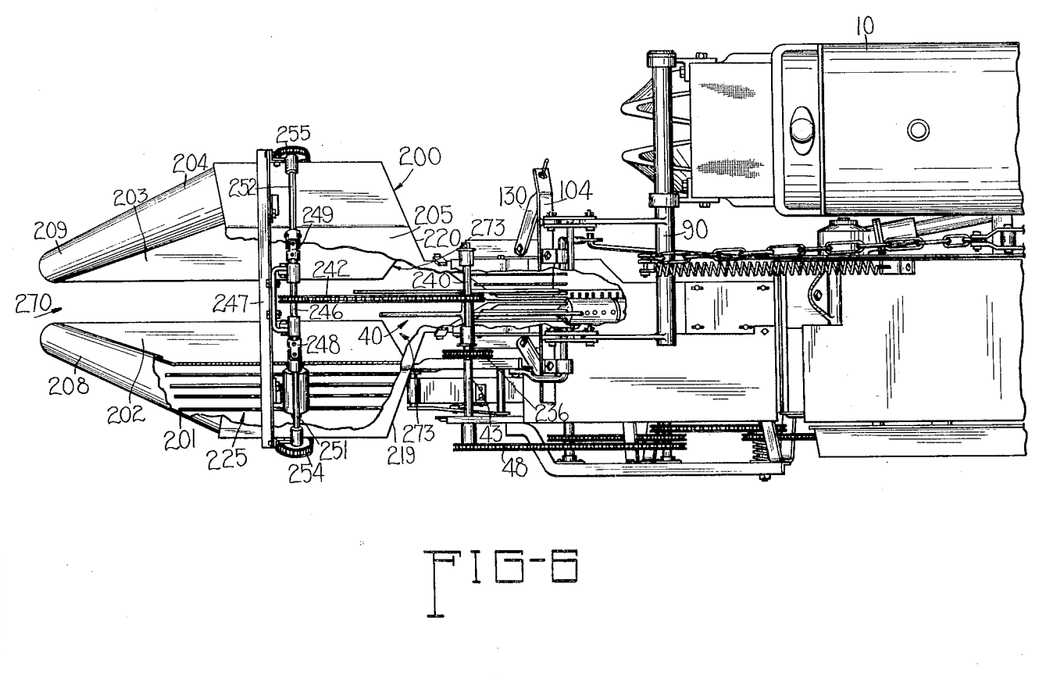
Figure 6 is a top plan view of a cotton stripper or harvester embodying the principles of the present invention in a slightly different form wherein the rotatable raking means and anti-clogging means have been built into the machine as an integral part thereof.
Figures 7, 8:
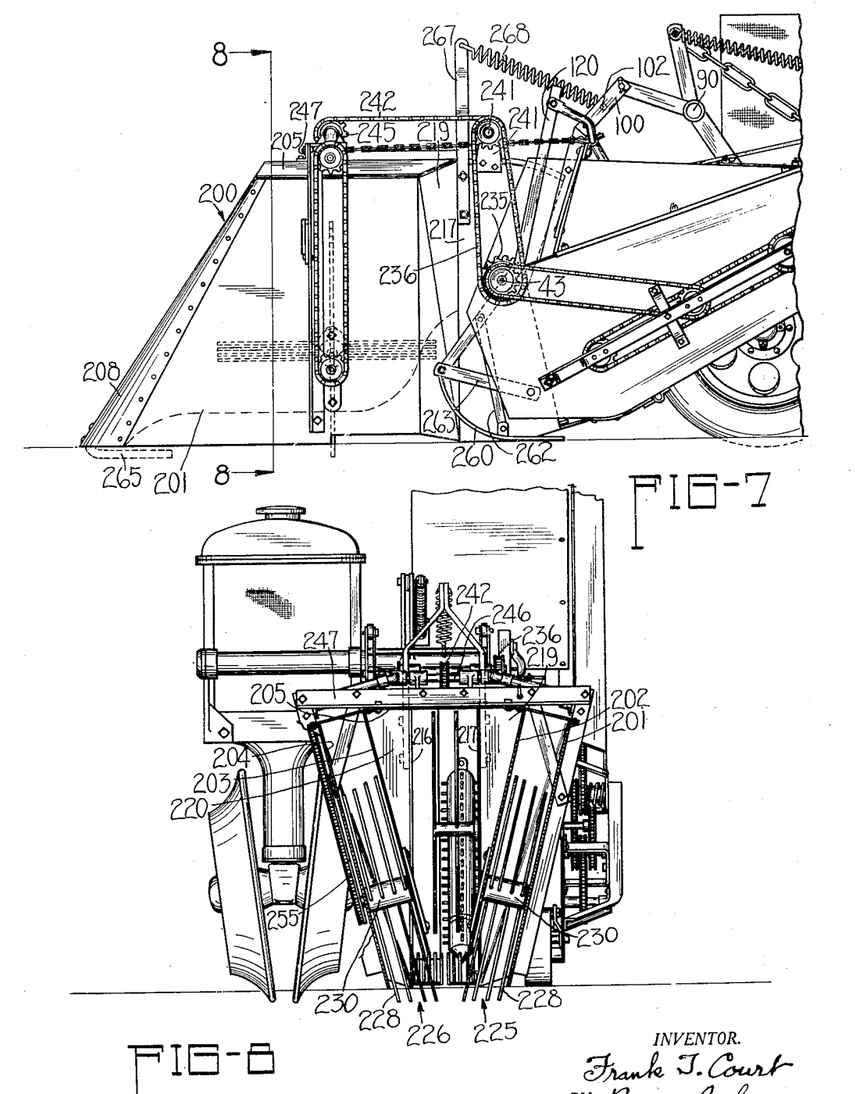
Figure 7 is a fragmentary side elevation of the front end of the machine shown in Figure 6.
Figure 8 is a transverse cross sectional view taken substantially along the line 8—8 of Figure 7.

In Figures 6, 7, and 8 another form of the present invention has been illustrated in which the mechanism having a function similar to the above described attachment comprising the rotatable rake element 160 has been built into the machine as an integral part thereof. This mechanism in the illustrated embodiment consists of a housing 200 having upwardly and outwardly inclined pairs of side walls 201 and 202 and 203 and 204, all joined by a top wall 205. The side walls of each of these pairs are joined at their forward edges by a curved portion, these curved portions being indicated by the reference numerals 208 and 209, respectively. The rear ends of these side members extend outwardly from and are connected with vertically disposed spaced side members 216 and 217 by means of transverse connecting walls 219 and 220. These walls 216 and 217 serve about the same function as the walls 53 and 54 of the modification illustrated in Figure 3 and are adapted to telescope within the tunnel housing 15 in a manner similar to that in which the tunnel housing 50 telescopes within the tunnel 15 in Figure 3. There is some difference however in the pivotal connections. In Figure 3 the tunnel housing 50 is pivotally connected with the tunnel housing 15 for movement about an axis defined by the pins 58 and 60. In the modification illustrated in Figures 6, 7, and 8, the housing 200 is pivotally connected with the forward end of the stripping mechanism for movement about an axis coincident with the axis of the shaft 43 on which the anti-clogging member 40 is secured.

Within the housing 200 and between the pair of walls 201 and 202 a rotating rake member 225 is provided and between the walls 203 and 204 a similar rotatable rake member is provided, these rotating members each comprising a series of flexible fingers 228 mounted on drums 230 which are fixed to shafts journaled between these walls. These shafts are disposed perpendicularly with respect to the planes of the walls and the inner fingers 228 are slightly longer than the outer ones so that all of the fingers will have the same amount of raking action with respect to the ground surface. This arises because the planes of rotation of these raking elements are not vertical but are inclined, as best illustrated in Figure 8. From this figure it will be noted that the lower portions of these rotating rake elements are disposed adjacent one another and are adjacent the plants passing through the machine while the upper portions of these raking elements are spaced apart. It will also be observed that the inner walls 202 and 203 serve to protect the plants from interference by the forwardly moving upper portions of the rotating rake elements 225 and 226.

The rotating rake elements 225 and 226 are driven from the shaft 43, just as the single raking elements 160 of Figure 3 is driven from this shaft.

The driving connections for the two inclined raking elements 225 and 226 include a sprocket 235 over which a chain 236 is trained. The upper bight of this chain is trained over a sprocket carried at one end of a shaft 240 supported by brackets 241 fixed at the top of the side members 216 and 217. A second sprocket is secured on this shaft, substantially midway thereof, and serves to drive a sprocket chain 242 extending forwardly and connected with a sprocket 245 fastened on a forward shaft 246. This latter shaft is journaled in suitable bearing brackets carried by a transverse angle bar 247 suitably secured to the top of the housing 200. Through universal joints 248 and 249 the shaft 246 drives a pair of inclined shafts 251 and 252 connected, respectively, to the rotating rake elements 225 and 226 to drive the same through sprocket chains 254 and 255. The shaft sections 251 and 252, of course, extend substantially perpendicularly with respect to the planes of the side walls 201 and 204.

In the machine illustrated in Figures 6 to 8, a runner or ground engaging skid 260 has been substituted for the gauge wheel 110 shown in the first modification. The movement of the runner 260 is substantially parallel to itself with respect to the front end of the stripping mechanism, due to the link connection 262 with the runner and with the lifting link 120. The forward end of the skid 260 is secured to the stripping mechanism by means of a brace 263.

The weight of the forward housing 200 is carried partly upon the stripping mechanism and partly upon ground engaging shoes 265 at the forward end of the housing 200. In order to impose a portion of the weight of the housing 200 on the stripping mechanism the rear portion of the housing 200, specifically, the walls 216 and 217, have secured thereto a pair of vertical arms 267 the upper ends of which are connected to a spring 268 the rear end of the latter being connected to the cross bar 102 serving, as described above, to connect the power lift links 100 and 101.

In the operation of the machine just described, the cotton plants pass into throatway 270 between the walls 202 and 203 as the machine advances, the plants passing back to the rotating element 40 and to the stripping mechanism. Due to the inclination of the rotating rake members 225 and 226 the fingers thereof rake the ground adjacent the plants on each side of the stalks and force the cotton picked up from the ground rearwardly into the throatway of the machine through openings 272 and 273 between the rear ends of the walls 202 and 203 and the transverse walls 219 and 220. In this modification as in the first described modification, the rotating element 40 feeds or directs any cotton toward the stripping mechanism and prevents any tendency for material to collect or clog the entrance to the stripper.

While I have described above the preferred structure, it will be understood that my invention is not to be limited to the specific means shown and described but that, in fact, widely different means may be employed in the practice of the broader aspects of my invention, as defined in the appended claims.

What I claim, therefore, and desire to secure by Letters Patent is:

1. In a cotton harvester, row following plant stripping mechanism having one end pivotally supported for swinging movement about a transverse axis, and rotatable means associated with the other end of said mechanism for feeding materials to said stripping mechanism.

2. In a cotton harvester, row following plant striping mechanism including a pair of spaced vertically disposed side walls, and rotatable means journaled in said side walls substantially above the forward end of said stripping mechanism to prevent packing of the material at this point.

3. In a cotton harvester, downwardly and forwardly inclined stripping mechanism, conveyor mechanism associated therewith, a pair of spaced vertically disposed side walls supporting said stripper mechanism for swinging movement relative to said conveyor mechanism, rotatable means comprising a hub member and a plurality of elongated radially extending fingers journaled near the forward end of said side walls, said rotatable means serving to clear material from the forward ends of said side walls, and means for driving said rotatable means from the conveyor mechanism.

4. In a cotton harvester, a frame, forwardly and downwardly inclined stripping rolls including a pair of spaced vertically disposed side members having pivotal connection with said frame to carry said rolls for up and down movement relative thereto, a rotatable member disposed between said side members for movement about the horizontal axis, and means for directing plants to said stripping rolls, said rotatable member being disposed above said last mentioned means.

5. A cotton harvesting machine comprising downwardly and forwardly inclined stripping mechanism, a tunnel housing enclosing said mechanism and having an open forward end, and a second tunnel housing telescopically associated with the forward end of said first tunnel housing.

6. A cotton harvesting machine comprising row following plant stripping mechanism, a tunnel housing enclosing said mechanism and having an open forward end to receive the plants, a second tunnel housing telescopically associated with said first tunnel housing and having an open forward end and an open bottom to receive the plants as they move toward said stripping mechanism, and means carried by the bottom of said second housing for guiding the plants toward said stripping mechanism.

7. A cotton harvesting machine comprising row following plant stripping means, a tunnel housing enclosing said means and having an open forward end, a second tunnel housing also having an open forward end and telescopically associated with said first tunnel housing, and means supporting one portion of said second housing on said first housing and another portion of the second housing on the ground.

8. A cotton harvester comprising row following plant stripping means, a tunnel housing enclosing said means and having an open forward end to receive the plants to be stripped, a second tunnel housing pivotally supported by said first housing and telescopically associated with the forward open end of said first housing, means supporting the forward end of said second housing on the ground, rotatable means journaled in said first housing and having a plurality of fingers movable within both of said housings for preventing an accumulation of material at the forward end of said first housing, and means for driving said rotatable means and said stripping means.

9. A cotton harvesting machine comprising row following plant stripping means, a tunnel housing for said stripping means including a pair of spaced vertically disposed side members, a transverse bar carried by said housing, and means co-operating therewith for adjusting one of said side members laterally relative to said stripping means.

10. In a cotton harvesting machine, row following plant stripping means comprising a housing having a pair of spaced vertically disposed members, a rotatable stripping element carried by one of said members, cooperating means carried by the other of said vertical members, and means for adjusting the position of said other member with respect to said stripping element.

11. A cotton harvesting machine comprising row following plant stripping means, a longitudinally disposed tunnel housing therefor including spaced side members, a transverse bar carried by said housing and extending laterally beyond the side members thereof, braces joining each of said members to the laterally outer ends of said transverse bar, and means for adjusting one of said braces to adjust the position of said side members relative to said stripping means.

12. A cotton harvesting machine comprising forwardly and downwardly inclined stripping mechanism, an operative means disposed in advance of said mechanism for moving loose cotton rearwardly with respect to the ground surface into said mechanism.

13. A cotton harvesting machine comprising row following plant stripping means, housing means disposed in advance of said stripping means, and rotatable means having a plurality of ground engaging fingers journaled in said housing and adapted to direct loose cotton toward said stripping means.

14. A cotton harvesting machine comprising a longitudinally disposed tunnel housing, plant stripping mechanism disposed therein, said housing having an open forward end to receive the plants to be stripped, and means for directing loose cotton to said stripping mechanism including rotatable raking means having resilient fingers adapted to contact with the ground and laterally spaced side members supporting said rotatable raking means.

15. A cotton harvesting machine comprising a stripper housing having an open forward end forming a throat, plant stripping mechanism disposed within said housing, means for guiding plants to said stripping mechanism, a rotatable member journaled for rotation in said housing and adapted to prevent accumulation of material at this point, and rotatable raking means disposed forwardly of said stripping mechanism and adapted to direct loose cotton on the ground toward said mechanism.

16. In a cotton harvester comprising row following plant stripping means, means carried by the harvester for raking loose cotton from the ground and directing the same toward said stripping means, said raking means comprising a pair of rotatable members having resilient ground engaging fingers and disposed in advance of said stripping means.

17. In a cotton harvester having row following plant stripping means, a raking attachment comprising means forming a hood having side walls and an open forward end, and raking means rotatable within said housing and having ground engaging portions adapted to direct loose cotton toward said stripping means.

18. In a cotton harvesting machine comprising row following plant stripping means, a raking attachment comprising a hood disposed forwardly of said plant stripping means and having generally upwardly extending side walls, rotatable raking elements carried by said side walls and arranged to direct loose cotton toward said stripping means, and means for driving said raking elements.

19. In a cotton harvesting machine comprising row following plant stripping means, a raking attachment comprising a hood having generally upwardly extending side walls spaced apart to lie on opposite sides of a plant row, a pair of rotatable raking members journaled on said side walls, said raking elements being inclined to bring their ground engaging portions close together substantially forwardly of said stripping means, and means for driving said rotatable raking elements.

20. A cotton harvesting machine comprising row following plant stripping means, a housing for said stripping means, means at the forward end of the housing for feeding plants toward said second means, and raking means for delivering loose cotton toward said stripping means, said raking means comprising a hood having downwardly converging outer and inner walls, the outer and inner wall on one side converging downwardly toward the outer and inner wall on the other side, rotatable raking means having flexible ground engaging fingers rotatably supported between each pair of outer and inner walls, and means for simultaneously driving both of said raking elements.

21. In a cotton harvester, upwardly and rearwardly inclined plant stripping mechanism, a housing therefor, guide means within said housing and cooperating therewith to direct plants to said stripping mechanism, and means disposed to operate in vertical spaced relation above said guide means and said stripping mechanism to prevent the accumulation of trash in said housing.

22. In a cotton harvester, upwardly and rearwardly inclined plant stripping mechanism, a housing therefor, guide means within said housing and cooperating therewith to direct plants to said stripping mechanism, and rotatable means journaled in said housing to prevent the accumulation of trash in said housing comprising a plurality of arm members having their radially outer end portions operating in spaced relation vertically above said guide means and stripping mechanism.

23. In a cotton harvester, a pivotally supported housing, plant stripping mechanism mounted within said housing and bodily movable therewith, means for raising and lowering said housing to inoperative and operative positions respectively, and anti-clogging means mounted in the forward open end of said housing and substantially above said stripping mechanism.

24. In a cotton harvester, a pivotally supported housing, plant stripping mechanism mounted within said housing and bodily movable therewith, means for raising and lowering said housing to inoperative and operative positions respectively, anti-clogging means carried by said housing, an auxiliary housing telescopically and pivotally connected with said first housing and projecting forwardly therefrom to enclose said anti-clogging means and to guide the plants therethrough, and means for limiting the pivotal movement of said auxiliary housing relative to said first housing when the latter is raised to inoperative position.

25. In a cotton harvester, a pivotally supported housing, plant stripping mechanism mounted within said housing and bodily movable therewith, means for raising and lowering said housing to inoperative and operative positions respectively, anti-clogging means carried by said housing, an auxiliary housing having one end thereof pivotally and telescopically connected with said first housing and projecting forwardly therefrom to enclose said anti-clogging means and to guide the plants therethrough, said auxiliary housing having its other end resting upon the ground, and gauge means associated with one of said housings and adjustable to dispose the stripping mechanism at various heights above the ground during the operation of said harvester.

26. In a cotton harvester, a pivotally supported housing, plant stripping mechanism mounted within said housing and bodily movable therewith, means for raising and lowering said housing to inoperative and operative positions respectively, anti-clogging means mounted in the forward open end of said housing and substantially above said stripping mechanism, and means operably movable relatively to the housing and in the longitudinal plane thereof and disposed in advance of said anti-clogging means for directing loose cotton lying upon the ground rearwardly therethrough into said housing and upon said stripping mechanism.

27. A cotton harvesting machine comprising plant stripping mechanism, and means comprising vertically and oppositely inclined members movable relative to the machine in a longitudinal plane thereof and disposed in advance of said mechanism for directing loose cotton lying upon the ground rearwardly in the longitudinal direction of the machine and into said mechanism.

28. A cotton harvesting machine comprising plant stripping mechanism, and means disposed in advance of said mechanism for directing loose cotton lying upon the ground rearwardly in the longitudinal direction of the machine and into said mechanism comprising vertically and oppositely inclined members, said members each having a plurality of rotatable elements, said elements of each member having their end portions engaging the ground tangentially to the horizontal plane thereof.

29. A cotton harvesting machine comprising plant stripping mechanism, and means disposed in advance of said mechanism for directing loose cotton lying upon the ground rearwardly in the longitudinal direction of the machine and into said mechanism comprising a pair of raking members oppositely inclined with respect to a longitudinal plane of the machine, each of said members having a plurality of laterally spaced raking elements all contacting the ground at substantially the same level.

30. A cotton harvesting machine comprising plant stripping mechanism, means disposed in advance of said mechanism for directing loose cotton lying on the ground rearwardly into said mechanism, and guard means associated with the aforesaid means to prevent the latter from engaging the cotton plants and to guide the loose cotton picked up by the aforesaid means into said stripping mechanism.

31. A cotton harvesting machine comprising plant stripping mechanism, adjacently disposed hood members supported in advance of said stripping mechanism, each of said members being provided with open bottoms and rear openings, and means within said hoods for directing loose cotton lying on the ground rearwardly through said rear openings and into said stripper mechanism.

32. A cotton harvesting machine comprising plant stripping mechanism, adjacently disposed hood members supported in advance of said mechanism, said hood members being inclined upwardly and laterally with respect to each other whereby the lower portions thereof are disposed in close proximity to the stems of the plants while the cotton bearing portions of the plants may freely pass between said members, and means carried by said hood members and engaging the ground adjacent the stems of the plants to direct loose cotton lying upon the ground rearwardly of the hood members and into the stripping mechanism.

33. A cotton harvesting machine comprising plant stripping mechanism, substantially adjacently disposed hood members supported in advance of said stripping mechanism, each of said members having an opening in the bottom portion thereof disposed substantially level with the ground and an opening in the rear portion thereof, and means within each hood member operating through the bottom opening thereof at a predetermined distance to engage the ground horizontally to direct loose cotton plants lying upon the ground longitudinally of the machine through the rear openings of the hood members and into the stripping mechanism.

34. A cotton harvesting machine comprising plant stripping mechanism, cooperative plant straddling means disposed in advance of said mechanism to direct loose cotton lying upon the ground rearwardly of the machine and into said stripping mechanism, and means interposed between said cooperative means and said stripping mechanism to prevent accumulation of trash forwardly of the stripping mechanism.

35. A cotton harvesting machine comprising forwardly and downwardly inclined stripping mechanism, and rotatable means mounted for rotation about a transverse substantially horizontal axis and adapted for directing loose cotton on the ground rearwardly in said mechanism.

36. A cotton harvesting machine comprising forwardly and downwardly inclined stripping mechanism, a frame supported for movement relative to the stripping mechanism, and a rotatable member disposed in advance of said mechanism for directing loose cotton on the ground rearwardly into said mechanism, said frame supporting said rotatable member for rising and falling movement with respect to said stripping means.

37. A cotton harvesting machine comprising forwardly and downwardly inclined stripping mechanism, and means disposed in advance of said mechanism and pivotally connected to the forward end thereof whereby it may follow the contour of the ground independently of said mechanism for guiding loose cotton on the ground toward said mechanism.

38. A cotton harvesting machine comprising forwardly and downwardly inclined stripping mechanism, and means comprising grates pivotally connected with the forward portions of said mechanism for free floating movement with respect thereto, whereby said grate means may follow the contour of the ground independently of said mechanism for guiding loose cotton on the ground toward said mechanism.

39. A cotton harvesting machine comprising forwardly and downwardly inclined stripping mechanism, a plurality of longitudinally disposed fingers serving as grates disposed in advance of said mechanism, supporting means carrying said fingers, and means pivotally connecting said supporting means with said mechanism, whereby said grates may follow the contour of the ground independently of said mechanism for guiding loose cotton on the ground toward said mechanism.

FRANK T. COURT.